(No Model.)

A. BANNATYNE.
CLOCK PINION.

No. 444,684. Patented Jan. 13, 1891.

UNITED STATES PATENT OFFICE.

ARCHIBALD BANNATYNE, OF WATERBURY, CONNECTICUT, ASSIGNOR TO THE WATERBURY CLOCK COMPANY, OF SAME PLACE.

CLOCK-PINION.

SPECIFICATION forming part of Letters Patent No. 444,684, dated January 13, 1891.

Application filed February 7, 1890. Serial No. 339,553. (No model.)

*To all whom it may concern:*

Be it known that I, ARCHIBALD BANNATYNE, of Waterbury, in the county of New Haven and State of Connecticut, have invented new Improvements in Clock-Pinions; and I do hereby declare the following, when taken in connection with the accompanying drawings and the letters of reference marked thereon, to be a full, clear, and exact description of the same, and which said drawings constitute part of this specification, and represent, in—

Figure 1:
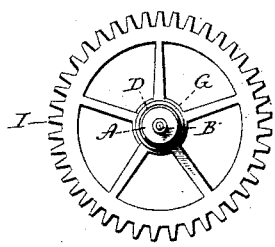
Figure 2:
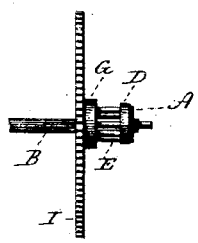
Figure 3:
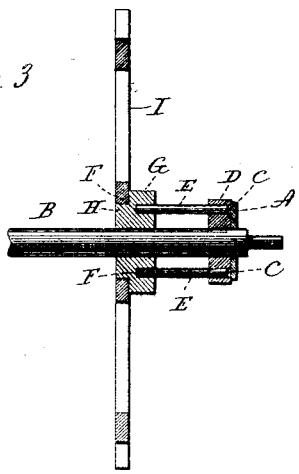

Figure 1, a view in end elevation of a pinion embodying my invention and looking toward the washer, which holds the leaves thereof in place; Fig. 2, a view of the pinion in side elevation with a portion of its staff broken away; Fig. 3, an enlarged view of the pinions in longitudinal section.

Heretofore the leaves of lantern-pinions have generally been secured in place by staking, which is done after putting the leaves in place by partially closing the outer ends of the perforations in the perforated collet of the pinion by means of a small punch. This process cannot, however, be used in the manufacture of very small pinions, as the staking would distort the collet, and thus destroy the accuracy of the pinion, and as the delicacy of the operation, owing to the smallness of the parts, would render the operation so slow and expensive as to be prohibitory. The leaves of lantern-pinions have also been secured in place by shouldering them at each end and interposing them between perforated collets, against the inner faces of which the shoulders engage, so as to prevent the endwise displacement of the leaves in either direction. Even when applied to making pinions of ordinary sizes the process last mentioned was objectionable, on account of the expense of turning down the ends of the leaves, and that same objection would prohibit its use in the smaller sizes of pinions, where the expense of turning the leaves would be greatly increased, to say nothing of weakening them. Another way was to insert the opposite ends of the leaves into independent recesses formed in the inner faces of both collets; but this method was expensive, and is not applicable to small pinions, as the recessing of small thin collets would be so difficult and delicate a process as to be practically prohibitory. It has also been proposed to secure the leaves of lantern-pinions in place by soldering them at one end in a collet and giving a finish to the article by a cap abutted against their free ends and preventing them from endwise displacement in case the soldering should be defective, but not positively supporting them against inward lateral displacement. Soldered pinions so made are not only objectionable in that their leaves are not positively supported against lateral movement, but also because the acids used in soldering rust the metal and react upon the oil used for lubrication. Owing to the reasons above stated, it has heretofore been found impracticable to make high-class lantern-pinions in the small sizes required for the small watch-like clocks now in vogue, and consequently solid pinions have been resorted to for that class of work; but solid pinions are always expensive, and especially so when made in the smaller sizes, which are exceedingly difficult to polish, and even when made in the best manner they are inferior in performance to lantern-pinions, which run with much less friction, are less affected by dirt and thickened oil, and are stronger in proportion to their size.

The object of this present invention is to provide for the convenient construction of accurate lantern-pinions in the small sizes required for the smallest clocks, and thus furnish a perfect and cheap substitute for the solid cut pinions heretofore employed in this line of work.

With these ends in view my invention consists in the combination, with a staff, of two collets mounted thereon, one of which is constructed with a circular series of perforations and the other with a series of corresponding seats, leaves extending through said perforations of the one collet and into the corresponding seats in the other collet, with a cap mounted on said staff directly against the outer face of said perforated collet, and whereby the said leaves are prevented both from lateral and endwise displacement.

My improved pinion, as herein shown, consists of an ordinary staff B, two collets D and G, mounted thereupon, one of the collets being constructed with a circular series of perforations and the other having a corresponding series of seats formed in its inner face, a series of wire leaves E, inserted through the said perforations and into the seats, and a centrally-perforated retaining-cap mounted upon the staff and placed directly against the outer face of the perforated collet, and closing the outer ends of the perforations therein, whereby the leaves are held against endwise displacement by the cap and by the bottoms of the seats, and against lateral displacement by the collets.

Although my invention is especially adapted for the production of small pinions for clocks, it is applicable to lantern-pinions of any size and for any use. Ordinarily it will be sufficient to rely upon friction between the cap and staff to hold the former in place; but in large pinions of this class some special retaining device may be employed, if desired.

By employing a retaining-cap, as described above, I am enabled to produce lantern-pinions in extremely small sizes, which has been practically impossible heretofore for the reasons already mentioned, and of very accurate character, as the parts are in no wise strained in being put together and as the leaves may be highly polished before assemblance. Moreover, the parts of my improved pinions are very readily assembled, whereby they may be cheaply produced. Under my invention, also, the leaves may be left free to rotate by making them short enough not to be bound endwise when the retaining-cap is applied. I am thus enabled to produce, if desired, a rolling leaf-pinion at a low cost.

Having fully described my invention, what I claim as new, and desire to secure by Letters Patent, is—

In a lantern-pinion, the combination, with a staff, of two collets mounted thereon, one of which is constructed with a circular series of perforations and the other with a series of corresponding seats, leaves extending through said perforations of the one collet and into the corresponding seats in the other collet, with a cap mounted on said staff directly against the outer face of said perforated collet, substantially as described, and whereby the said leaves are prevented both from lateral and endwise displacement.

ARCHIBALD BANNATYNE.

Witnesses:
WM. A. HOLGATE,
ABR. C. DEPEW.